(12) United States Patent
Scheja et al.

(10) Patent No.: US 12,028,506 B2
(45) Date of Patent: Jul. 2, 2024

(54) MODEL-BASED COMPENSATION OF GEOMETRICAL DEFORMATION OF A STEREO CAMERA BY EVALUATING A CALIBRATED ANALYTIC DEFORMATION MODEL OF THE STEREO CAMERA

(71) Applicant: HEXAGON TECHNOLOGY CENTER GMBH, Heerbrugg (CH)

(72) Inventors: Jochen Scheja, Hohenems (AT); Michael Sutter, Wil (CH); Ali Mazloomi Moqaddam, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 271 days.

(21) Appl. No.: 17/579,531

(22) Filed: Jan. 19, 2022

(65) Prior Publication Data

US 2022/0232197 A1 Jul. 21, 2022

(30) Foreign Application Priority Data

Jan. 20, 2021 (EP) .................................... 21152616

(51) Int. Cl.
*H04N 13/246* (2018.01)
*G06T 7/593* (2017.01)
(Continued)

(52) U.S. Cl.
CPC ........... *H04N 13/246* (2018.05); *G06T 7/593* (2017.01); *G06T 7/85* (2017.01); *H04N 13/239* (2018.05); *G06T 2207/10012* (2013.01)

(58) Field of Classification Search
CPC ....... H04N 13/246; H04N 13/239; G06T 7/85
See application file for complete search history.

(56) References Cited

U.S. PATENT DOCUMENTS 10,796,425 B1 10/2020 Patel et al.
2013/0275099 A1* 10/2013 Frydman ................. E21B 47/10
703/2

(Continued)

FOREIGN PATENT DOCUMENTS

CN 108986171 A 12/2018
CN 110673142 A 1/2020

(Continued)

OTHER PUBLICATIONS

European Search Report dated Jun. 9, 2021 as received in application No. 21152616.5.

(Continued)

*Primary Examiner* — Jayanti K Patel
*Assistant Examiner* — Christopher Kingsbury Glover
(74) *Attorney, Agent, or Firm* — Maschoff Brennan

(57) ABSTRACT

A method for numerically compensating imaging errors caused by a geometrical deformation of a stereo camera is provided. An inertial variable vector is provided that is determined by an accelerometer, which inertial variable vector is expressed in a stereo camera coordinate system with a known geometrical relationship between the stereo camera coordinate system and the world coordinate system, and which inertial variable vector relates to a physical force which at least partly causes the geometrical deformation of the stereo camera. A calibrated analytic deformation model of the stereo camera is evaluated with the inertial variable vector as input. Updated external camera parameters are determined. The updated external camera parameters and known internal camera parameters of the two cameras are used for stereophotogrammetric analysis of images acquired by the stereo camera.

20 Claims, 3 Drawing Sheets

(51) Int. Cl.
*G06T 7/80* (2017.01)
*H04N 13/239* (2018.01)

(56) References Cited

U.S. PATENT DOCUMENTS

| | | | |
|---|---|---|---|
| 2016/0278732 A1* | 9/2016 | Amiri | A61B 6/547 |
| 2017/0104979 A1* | 4/2017 | Shaw | H04N 13/239 |
| 2018/0105286 A1* | 4/2018 | Onomura | H04N 13/254 |
| 2018/0174279 A1 | 6/2018 | Anhut et al. | |
| 2020/0372679 A1 | 11/2020 | Javan Roshtkhari et al. | |
| 2023/0296408 A1* | 9/2023 | Viala | G06T 7/85 |
| | | | 702/94 |

FOREIGN PATENT DOCUMENTS

| | | |
|---|---|---|
| DE | 10 2007 050 558 A1 | 5/2008 |
| FR | 3 043 824 A3 | 5/2017 |
| JP | 2005-024464 A | 1/2005 |
| WO | 2015/051468 A1 | 4/2015 |

OTHER PUBLICATIONS

CN First Office Action dated Oct. 13, 2023 as received in Application No. 202210048070.9.

* cited by examiner

MODEL-BASED COMPENSATION OF GEOMETRICAL DEFORMATION OF A STEREO CAMERA BY EVALUATING A CALIBRATED ANALYTIC DEFORMATION MODEL OF THE STEREO CAMERA

BACKGROUND

The present disclosure relates to a method, computer program products and a stereo camera according to the preambles of the independent claims.

To carry out 3D measurements with a camera or with multiple cameras, cameras need to be calibrated. Camera parameters are often separated into internal (or intrinsic) and external (or extrinsic) camera parameters, internal camera parameters e.g. relating to focal length and external camera parameters e.g. relating to a position and orientation of a camera in a world coordinate system. For two cameras, i.e. a stereo camera, 3D measurement information may be provided with the essential matrix, for example.

Camera systems such as stereo cameras are typically calibrated before being used for 3D measurements. For calibration, it is sometimes assumed that a common holder on which the cameras of a stereo camera are mounted is rigid. Accurate calibration with accuracy in the micrometer range may be, dependent on the load case, not feasible, not sufficient or very laborious. Different orientations of a stereo camera may—due to inertial forces such as gravity or other acceleration-dependent forces—geometrically deform the stereo camera, changing the relative orientation and position between the cameras of the stereo camera. A stereophotogrammetric analysis based on images taken by such a geometrically deformed stereo camera in general provides inaccurate 3D estimation if the geometric deformation is not taken into account during calibration. As calibration is not always feasible for all possible orientations of a stereo camera—particularly because a stereo camera may be used with many possible orientations—geometrical deformation typically leads to a loss in 3D measurement accuracy.

SUMMARY

It is therefore an objective to provide a method and a computer program product for compensating imaging errors due to a geometrical deformation of a stereo camera.

This objective is achieved by realizing the characterizing features of the independent claims. Features which further develop embodiments in an alternative or advantageous manner are described herein.

The disclosure relates to a method for numerically compensating imaging errors caused by a geometrical deformation of a stereo camera having two internally calibrated cameras and known nominal external camera parameters with respect to a world coordinate system, the known nominal external camera parameters comprising information about two nominal camera coordinate systems for the two cameras respectively. An inertial variable vector determined by an accelerometer is provided, which inertial variable vector is expressed in a stereo camera coordinate system with a known geometrical relationship between the stereo camera coordinate system and the world coordinate system, and which inertial variable vector relates to a physical force which at least partly causes the geometrical deformation of the stereo camera. The method comprises the following steps: 1) evaluating a calibrated analytic deformation model of the stereo camera with the inertial variable vector as input to the calibrated analytic deformation model, the evaluation determining angular and positional updates to at least one of the known nominal camera coordinate systems, 2) using the angular and positional updates to determine external camera parameter offsets, 3) determining updated external camera parameters by adding the external camera parameter offsets to the known nominal external camera parameters, and 4) using the updated external camera parameters and known internal camera parameters of the two cameras for stereophotogrammetric analysis of images acquired by the stereo camera.

One of the two cameras may also be replaced by a projector configured to project a pattern onto a scene to be measured. The projector may also be associated to the nominal camera coordinate system of the camera which it replaces.

The inertial variable vector relates to an inertial force causing the geometrical deformation of the stereo camera. Besides inertial forces, other physical forces, e.g. caused by temperature gradients, may lead to a geometrical deformation of the stereo camera.

In the method according to one embodiment, it is assumed that internal camera parameters are only weakly affected by a geometrical deformation due to inertial forces. No offsets to internal camera parameters are therefore computed.

For determining a geometrical deformation of the stereo camera due to an inertial force, knowledge of the direction and magnitude of the inertial variable vector with respect to the stereo camera coordinate system may be used, i.e. a relative orientation of e.g. the direction of gravity with respect to the stereo camera.

The calibrated analytic deformation model may alternatively directly provide external camera parameter offsets, i.e. steps 1) and 2) of the method may be carried out in one step. The calibrated analytic deformation model does not provide absolute external camera parameter values, but external camera parameter offsets. The calibrated analytic deformation model may therefore be embodied as e.g. a simplified linear model as compared to a full nonlinear model which may be necessary for determining absolute extrinsic camera parameter values.

In an embodiment of the method, the inertial variable vector is a gravity vector.

In another embodiment of the method, the calibrated analytic deformation model is embodied as a linear elastic model of the stereo camera.

In a further embodiment of the method, the numerical compensation is applied to images acquired by the stereo camera under static conditions.

The stereo camera may not move when acquiring images; its position and orientation with respect to the world coordinate system may be static while acquiring images.

In a further embodiment of the method, the calibrated analytic deformation model is obtained from an analytic deformation model with free parameters, wherein value assignments for the free parameters are determined through a calibration process.

In a further embodiment of the method, the calibration process receives as input a calibration set relating to the stereo camera in a plurality of calibration poses, wherein the calibration set comprises for each calibration pose 1) actual external camera parameters, wherein the actual external camera parameters correspond to a geometrically deformed stereo camera in a calibration pose, 2) nominal external camera parameters, and 3) an inertial variable vector expressed in the stereo camera coordinate system, wherein a geometric relationship between the world coordinate system and the stereo camera coordinate system differs between different calibration poses. The calibration process uses 1) a cost function for measuring residuals between the actual extrinsic camera parameters and updated extrinsic camera parameters obtained by evaluating the analytic deformation model with the inertial variable vector as input and adding the obtained external camera parameter offsets to the nominal external camera parameters, and 2) an optimization algorithm, which identifies value assignments for the free parameters using the cost function evaluated on the calibration set, in particular wherein the optimization algorithm identifies a value assignment of the free parameters which minimizes the cost function over the calibration set.

Besides minimization, maximization is—depending on the cost function—feasible as well. Minimization or maximization may converge on a saddle point of the cost function landscape over the calibration set. Maximization may also converge on a global or local maximum, and minimization may also converge on a global or local minimum of the cost function landscape over the calibration set.

The actual external camera parameter values are typically more precise than the updated external camera parameter values, actual external camera parameter values being close or equal to ground truth.

The stereo camera coordinate system may be fixed with respect to the stereo camera, but its positions and orientation in the world coordinate system may change in case of different poses.

The calibration set may comprise calibration poses chosen according to different criteria. Calibration poses found in the calibration set may e.g. be distributed uniformly over a space of possible orientations of the stereo camera. Calibration poses may also be nonuniformly distributed over the space of possible orientations of the stereo camera. A nonuniform distribution may e.g. be tailored to expected stereo camera orientations found in practical use cases. Those parts of the space of possible orientations which are expected to be more often encountered in a practical use case may e.g. be overrepresented in the calibration set as compared to less often encountered parts of the space of possible orientations. A nonuniform distribution of calibration poses may also be tailored to a deformation sensitivity: parts of the space of possible orientations in which small orientation changes e.g. produce large external camera parameter deviations away from nominal external camera parameters may e.g. be overrepresented in the calibration set as compared to parts of the space of possible orientations in which small orientation changes have a small impact on external camera parameter deviations. Deformation sensitivity can e.g. be derived from a finite element pre-analysis/pre-modelling using a coarse computational mesh on which the finite element pre-analysis/pre-modelling is carried out. The finite element pre-analysis may determine geometrical deformations of the stereo camera. A computational mesh size used for such a pre-analysis may be coarse compared to a computational mesh size used for a finite element analysis for a precise ground truth estimation of geometrical deformations of the stereo camera.

In a further embodiment of the method, the cost function is embodied as a sum of squared residuals, and/or the optimization algorithm is embodied as a gradient descent algorithm.

Any other cost function or optimization algorithm known from the optimization literature is however in principle feasible as well.

In another embodiment of the method, the analytic deformation model has four free parameters.

Fewer free parameters may provide greater robustness and stability to the calibrated analytic deformation model. Additionally, for learning a small number of free parameters a calibration set with fewer elements is in general required as compared to an analytic deformation model with a larger number of free parameters.

In a further embodiment of the method, for each calibration pose, the actual external camera parameters are obtained using a finite element analysis simulating the geometrical deformation of the stereo camera based on the calibration pose.

Finite element analysis may be used for a precise ground truth estimation of the geometrically deformed stereo camera. Using finite element analysis, geometrical deformations may be estimated by solving linear elastic equations evaluated on a computational mesh of the stereo camera, or also by solving nonlinear deformation equations evaluated on the computational mesh.

In a further embodiment of the method, the world coordinate system is embodied as a Cartesian coordinate system, and the inertial variable vector is a gravity vector, wherein one axis of the world coordinate system points in the direction of the gravity vector (called gravity axis in the following), and the calibration poses comprise only rotations of the stereo camera around at least one of the remaining two axes.

Rotations around the gravity axis in general do not lead to different geometrical deformations of the stereo camera, provided no rotations around the remaining two axes take place. In a static case without further acceleration besides gravitation, geometrical deformations are invariant against any rotations around the gravity axis. Consequently, also the calibration set is symmetric for any such rotation. Fixing orientations with respect to the remaining two axes of the world coordinate system and rotating only around the gravity axis does not increase the number of different geometrical deformations present in the calibration set.

The disclosure relates to a first computer program product configured to provide numerical compensation of imaging errors caused by a geometrical deformation of a stereo camera.

The first computer program product may therefore be used in operation, i.e. a calibrated analytic deformation model is part of the first computer program product.

The disclosure relates to a second computer program product configured to provide a calibrated analytical deformation model as in the method.

The second computer program product determines a calibrated analytical deformation model which can be used subsequently by the first computer program product.

The first and second computer program products may in principle also be combined in a single computer program product.

The disclosure also relates to a stereo camera comprising two cameras mounted on a common holder, an accelerometer mounted on the common holder, the accelerometer in particular measuring the direction of gravity, and a computing device comprising program code as in the first computer program product.

In a further embodiment of the stereo camera, the stereo camera additionally comprises a strain gauge mounted on the common holder.

A strain gauge combined with an element of known mass and elasticity may provide accelerometer functionality. The element of known mass and elasticity may be an integral part of the stereo camera, or it may be additionally added to the stereo camera together with the strain gauge. An accelerometer may therefore be also provided by a strain gauge configured to interact with an element of known mass and elasticity.

In a further embodiment of the stereo camera, the common holder is embodied as a beam having a main direction, and the two cameras are mounted on a same side of the beam at opposite ends with respect to the main direction.

BRIEF DESCRIPTION OF THE DRAWINGS

The disclosure is described below in more detail purely by way of example with the aid of concrete exemplary embodiments illustrated schematically in the drawings, further advantages of the disclosure also being examined Identical elements are labelled with the same reference numerals in the figures. In detail.

DETAILED DESCRIPTION

Figure 1:
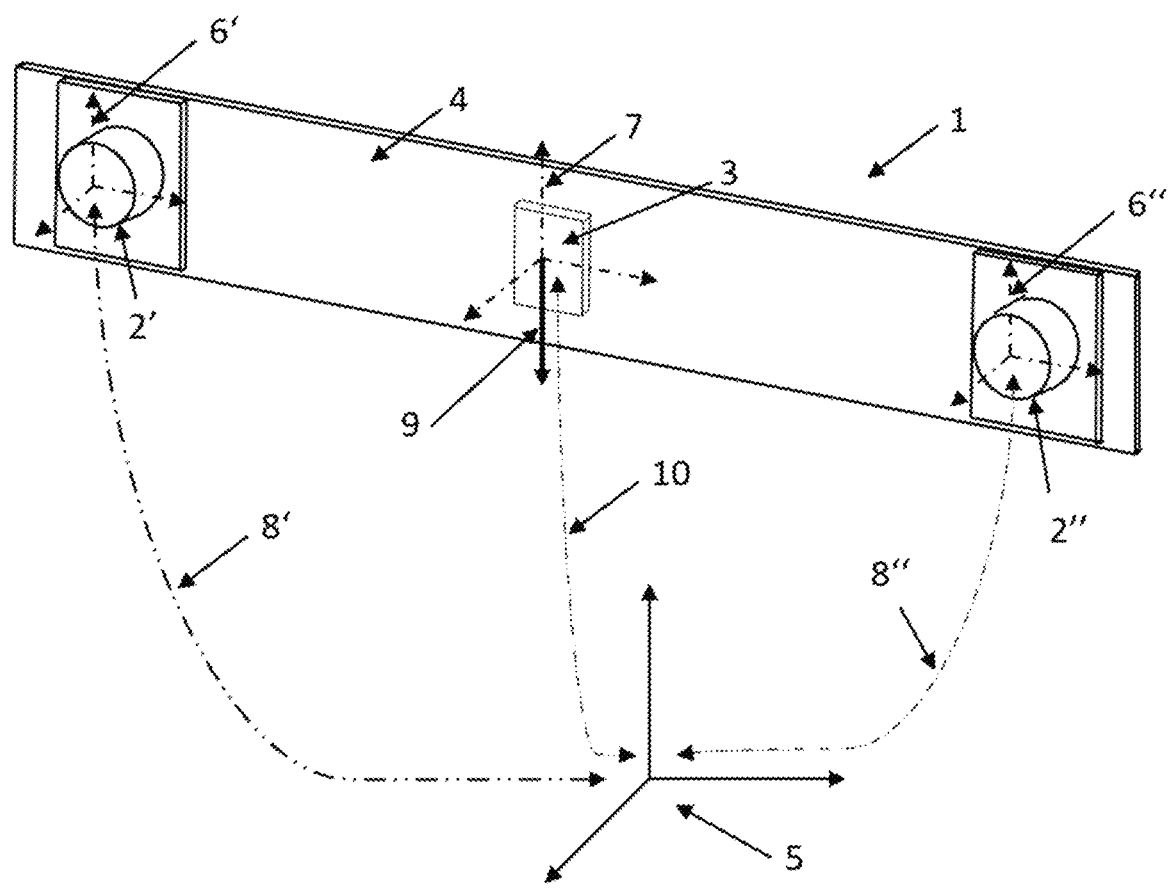
FIG. 1 shows an embodiment of a stereo camera and an illustrative depiction of coordinate systems used by the method.

FIG. 1 shows an embodiment of a stereo camera 1 and an illustrative depiction of coordinate systems 5,6',6",7 used by the method.

In case the stereo camera 1 is to be used for accurately determining 3D positions of objects in a room, for example, positions and orientations of the stereo camera 1 in a world coordinate system 5 are recorded. This way, separate 3D measurements performed by the stereo camera 1 may be mapped to one common reference system, the world coordinate system 5. For accurate 3D measurements, precise positions and orientations of the cameras 2',2" of the stereo camera 1 may need to be known in the world coordinate system 5. It may also be sufficient to obtain 3D measurements with respect to the stereo camera 1. In this case only relative positions and orientations of the cameras 2',2" to each other may need to be known.

For each 3D measurement taken by the stereo camera 1, it may be assumed that nominal external camera parameters relating nominal positions and orientations of the cameras 2',2" to the world coordinate system 5 during the 3D measurement are known.

The stereo camera 1 comprises a common holder 4, the common holder 4 embodied as a beam in FIG. 1. The cameras 2',2" of the stereo camera 1 are internally calibrated and are mounted at opposite ends of the beam, the two internally calibrated cameras 2',2" facing in the same direction. Besides facing in the same direction, the two cameras 2',2" may also cover an overlapping field of view, i.e. the two cameras 2',2" may be inclined with respect to each other. An accelerometer 3 is mounted on the beam, too, the accelerometer 3 e.g. being placed centrally and symmetrically on the beam 4.

Three coordinate systems 6',6",7 may be associated to the stereo camera 1: two nominal camera coordinate systems 6',6" for the two internally calibrated cameras 2',2", the two nominal camera coordinate systems 6',6" relating to nominal positions and orientations of the two internally calibrated cameras 2',2", and a stereo camera coordinate system 7 for the beam 4. The two cameras 2',2" may be positioned symmetrically with respect to a center point of the beam 4.

The two cameras 2',2" may also be attached with their center of mass close to a shear center point of the beam 4 in order to minimize a torsional deformation of the beam 4.

The fixed world coordinate system 5, e.g. placed outside of the stereo camera 1, is used to describe an absolute position and orientation of the two nominal camera coordinate systems 6',6" and of the stereo camera coordinate system 7, absolute position and orientation being described with respect to the world coordinate system 5. The respective position and orientation of these three coordinate systems 6',6",7 are known in the world coordinate system by the associated coordinate transforms 8',8",10.

The accelerometer 3 measures an inertial variable vector 9, e.g. a gravity vector. The inertial variable vector 9 is expressed in the stereo camera coordinate system 7.

The impact of e.g. gravity 9 influences the precise positions of the two cameras 2',2", wherein e.g. due to gravity the two cameras 2',2" may in general move away from prescribed nominal positions and orientations encoded by the two nominal camera coordinate systems 6',6". The precise changes in general depend on the orientation of the stereo camera 1 with respect to the inertial variable vector 9, i.e. different orientations may lead to different position and orientation changes of the two cameras 2',2". Actual camera positions and orientations of the two cameras 2',2" therefore in general differ from nominal camera positions and orientations due to inertial influences 9, e.g. due to gravity.

All coordinate systems 5,6',6",7 shown in FIG. 1 are depicted as Cartesian coordinate systems. The use of other coordinate systems, however, is feasible as well.

Figure 2:
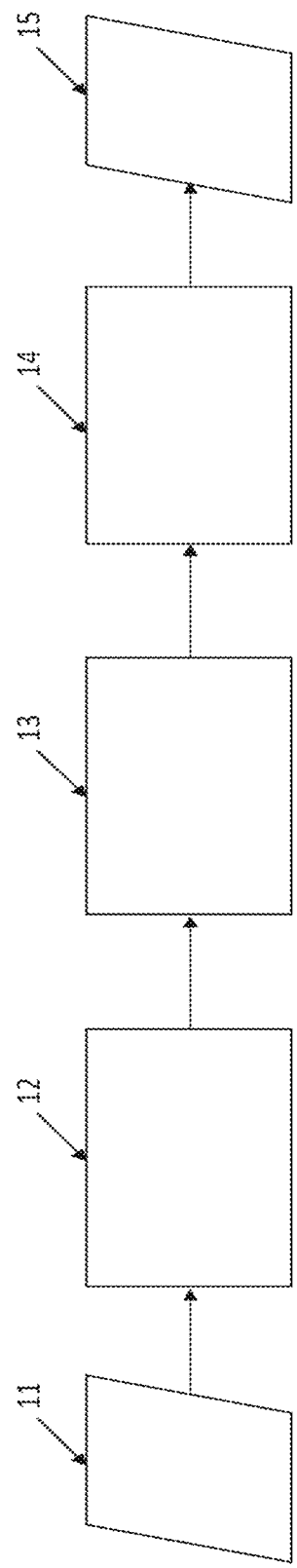
FIG. 2 shows a schematic and illustrative depiction of the method.

FIG. 2 shows a schematic and illustrative depiction of the method for numerically compensating imaging errors of a stereo camera 1, which are caused by a geometrical deformation, e.g. due to gravity.

In a first step 11, an inertial variable vector 9, e.g. a gravity vector, is provided by an accelerometer 3, wherein the inertial variable vector 9 is expressed in the stereo camera coordinate system 7. In a subsequent evaluation 12, a calibrated analytic deformation model 20 is then evaluated, the inertial variable vector 9 being an input to the calibrated analytic deformation model 20.

The evaluation 12 of the calibrated analytic deformation model 20 provides angular and positional updates to at least one of the two nominal camera coordinate systems 6',6". By using 13 the angular and positional updates, external camera parameter offsets are determined, as external camera parameters are related to a position and orientation of a camera, e.g. described by a camera coordinate system, in a world coordinate system.

Updated external camera parameters are then determined 14 by adding the external camera parameter offsets to the known nominal external camera parameters. The updated external camera parameters are related to the geometrically deformed stereo camera 1. As a calibrated camera model typically comprises both internal camera parameters—which are assumed to be known and unchanged by geometrical deformations—and external camera parameters, an updated camera model may subsequently be used 15 for stereophotogrammetric purposes.

Figure 3:
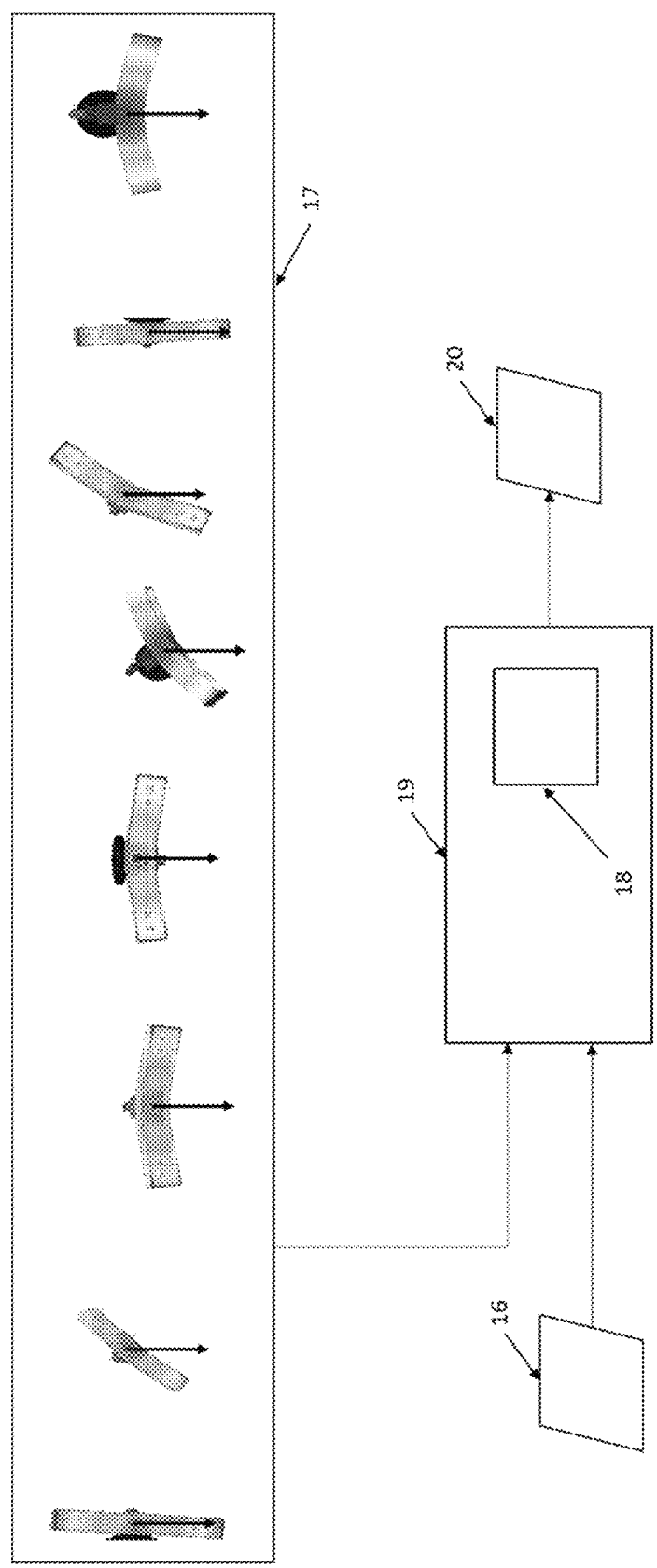
FIG. 3 shows a schematic and illustrative depiction of the calibration process determining parameter values for the analytic deformation model.

FIG. 3 shows a schematic and illustrative depiction of the calibration process determining parameter values for the analytic deformation model 16, the calibration process providing the calibrated analytic deformation model 20.

The calibration process may operate on a calibration set 17, the calibration set 17 comprising information on the geometrical deformations of the stereo camera 1 due to inertial forces, e.g. gravity, in different poses.

Depending on the inertial forces acting on the stereo camera 1, actual positions of the cameras 2′,2″ of the stereo camera 1 may deviate from nominal positions. The calibration set 17 comprises—for different orientations of the stereo camera 1—for each element of the calibration set actual external camera parameters, nominal external camera parameters and an inertial variable vector. Different stereo camera 1 poses and inertial variable vectors 9 are symbolically shown in FIG. 3, the inertial variable vectors shown as black arrows.

Actual external camera parameters may be determined using a finite element analysis, for example, wherein the finite element analysis determines the actual shape of the stereo camera 1 due to inertial forces acting on the stereo camera 1. Alternatively, a stereo camera 1 may be physically positioned in different poses, and actual external camera parameters may be determined by physical measurements carried out on the geometrically deformed stereo camera 1.

An analytic deformation model 16 with free parameters may be used to determine external camera parameter offsets, which external camera parameter offsets may be used to transform nominal external camera parameters to actual external camera parameters. The analytic deformation model 16 may therefore be embodied as a simplified linear model, for example, as it may be only used for determining geometrical deformation information around a working point; the analytic deformation model 16 may e.g. model linear elastic deformations; a full nonlinear simulation of deformation physics may therefore not be required.

The free parameters of the analytic deformation model 16 may be trained using an optimization algorithm 19 which may use a cost function 18 as a metric to be optimized. The optimization algorithm 19 may attempt to minimize or to maximize the cost function 18 evaluated over the calibration set 17, or it may attempt to reach a saddle point. The optimization algorithm may be embodied as a gradient descent algorithm in case the analytic deformation model 16 and the cost function 18 are differentiable in the free parameters, or as any other optimization method known from optimization literature. The overall calibration process using the optimization algorithm 19 provides a value assignment to the free parameters of the analytic deformation model 16, i.e. the calibrated analytic deformation model 20. The calibrated analytic deformation model 20 may learn to interpolate between external camera parameter offsets found in the calibration set, i.e. it may learn to provide external camera parameter offsets for stereo camera poses not used in the calibration set.

Instead of operating on absolute values of actual external camera parameters and updated external camera parameters, the cost function 18 may alternatively operate on actual external camera parameter offsets—determined using the actual external camera parameters and nominal external camera parameters—and external camera parameter offsets determined by evaluating the analytic deformation model 16.

It goes without saying that these figures illustrated are merely schematics of possible exemplary embodiments.

Although embodiments of the disclosure are illustrated above, partly with reference to some embodiments, it must be understood that numerous modifications and combinations of different features of the embodiments can be made. All of these modifications lie within the scope of the appended claims.

What is claimed is:

1. A method for numerically compensating imaging errors caused by a geometrical deformation of a stereo camera having two internally calibrated cameras and known nominal external camera parameters with respect to a world coordinate system, the known nominal external camera parameters comprising information about two nominal camera coordinate systems for the two cameras respectively, comprising:
   providing an inertial variable vector determined by an accelerometer, which inertial variable vector is expressed in a stereo camera coordinate system with a known geometrical relationship between the stereo camera coordinate system and the world coordinate system, and which inertial variable vector relates to a physical force which at least partly causes the geometrical deformation of the stereo camera,
   evaluating a calibrated analytic deformation model of the stereo camera with the inertial variable vector as input to the calibrated analytic deformation model, the evaluation determining angular and positional updates to at least one of the known nominal camera coordinate systems,
   using the angular and positional updates to determine external camera parameter offsets,
   determining updated external camera parameters by adding the external camera parameter offsets to the known nominal external camera parameters, and
   using the updated external camera parameters and known internal camera parameters of the two cameras for stereophotogrammetric analysis of images acquired by the stereo camera,
   wherein the calibration process receives as input:
   a calibration set relating to the stereo camera in a plurality of calibration poses, wherein the calibration set comprises for each calibration pose:
      actual external camera parameters, wherein the actual external camera parameters correspond to a geometrically deformed stereo camera in a calibration pose,
      nominal external camera parameters,
      an inertial variable vector expressed in the stereo camera coordinate system, wherein a geometric relationship between the world coordinate system and the stereo camera coordinate system differs between different calibration poses, and uses,
   a cost function for measuring residuals between:
      the actual extrinsic camera parameters and
      updated extrinsic camera parameters obtained by evaluating the analytic deformation model with the inertial variable vector as input and adding the obtained external camera parameter offsets to the nominal external camera parameters,
   and an optimization algorithm, which identifies value assignments for the free parameters using the cost function evaluated on the calibration set, in particular wherein the optimization algorithm identifies a value assignment of the free parameters which minimizes the cost function over the calibration set.

2. The method according to claim 1, wherein the inertial variable vector is a gravity vector.

3. The method according to claim 1, wherein the calibrated analytic deformation model is embodied as a linear elastic model of the stereo camera.

4. The method according to claim 1, wherein the numerical compensation is applied to images acquired by the stereo camera under static conditions.

5. The method according to claim 1, wherein the calibrated analytic deformation model is obtained from an analytic deformation model with free parameters, wherein value assignments for the free parameters are determined through a calibration process.

6. The method according to claim 5, wherein the cost function is embodied as a sum of squared residuals, or the optimization algorithm is embodied as a gradient descent algorithm.

7. The method according to claim 1, wherein the cost function is embodied as a sum of squared residuals, and/or the optimization algorithm is embodied as a gradient descent algorithm.

8. The method according to claim 5, wherein the analytic deformation model has four free parameters.

9. The method according to claim 1, wherein for each calibration pose, the actual external camera parameters are obtained using a finite element analysis simulating the geometrical deformation of the stereo camera based on the calibration pose.

10. The method according to claim 1, wherein the world coordinate system is embodied as a Cartesian coordinate system, and the inertial variable vector is a gravity vector, wherein one axis of the world coordinate system points in the direction of the gravity vector, and the calibration poses comprise only rotations of the stereo camera around at least one of the remaining two axes.

11. The method according to claim 7, wherein the analytic deformation model has four free parameters.

12. The method according to claim 8, wherein for each calibration pose, the actual external camera parameters are obtained using a finite element analysis simulating the geometrical deformation of the stereo camera based on the calibration pose.

13. The method according to claim 9, wherein the world coordinate system is embodied as a Cartesian coordinate system, and the inertial variable vector is a gravity vector, wherein one axis of the world coordinate system points in the direction of the gravity vector, and the calibration poses comprise only rotations of the stereo camera around at least one of the remaining two axes.

14. A computer program product configured to provide numerical compensation of imaging errors caused by a geometrical deformation of a stereo camera in a method comprising:
   providing an inertial variable vector determined by an accelerometer, which inertial variable vector is expressed in a stereo camera coordinate system with a known geometrical relationship between the stereo camera coordinate system and the world coordinate system, and which inertial variable vector relates to a physical force which at least partly causes the geometrical deformation of the stereo camera,
   evaluating a calibrated analytic deformation model of the stereo camera with the inertial variable vector as input to the calibrated analytic deformation model, the evaluation determining angular and positional updates to at least one of the known nominal camera coordinate systems,
   using the angular and positional updates to determine external camera parameter offsets,
   determining updated external camera parameters by adding the external camera parameter offsets to the known nominal external camera parameters, and
   using the updated external camera parameters and known internal camera parameters of the two cameras for stereophotogrammetric analysis of images acquired by the stereo camera,
   wherein the calibration process receives as input:
   a calibration set relating to the stereo camera in a plurality of calibration poses, wherein the calibration set comprises for each calibration pose:
      actual external camera parameters, wherein the actual external camera parameters correspond to a geometrically deformed stereo camera in a calibration pose,
      nominal external camera parameters,
      an inertial variable vector expressed in the stereo camera coordinate system, wherein a geometric relationship between the world coordinate system and the stereo camera coordinate system differs between different calibration poses, and uses,
   a cost function for measuring residuals between:
      the actual extrinsic camera parameters and
      updated extrinsic camera parameters obtained by evaluating the analytic deformation model with the inertial variable vector as input and adding the obtained external camera parameter offsets to the nominal external camera parameters,
   and an optimization algorithm, which identifies value assignments for the free parameters using the cost function evaluated on the calibration set, in particular wherein the optimization algorithm identifies a value assignment of the free parameters which minimizes the cost function over the calibration set.

15. The computer program product configured to provide numerical compensation of imaging errors caused by a geometrical deformation of a stereo camera as in claim 14, wherein the numerical compensation is applied to images acquired by the stereo camera under static conditions.

16. The computer program product as in claim 14, wherein the calibrated analytic deformation model is obtained from an analytic deformation model with free parameters, wherein value assignments for the free parameters are determined through a calibration process 5.

17. The computer program product as in claim 14, wherein the world coordinate system is embodied as a Cartesian coordinate system, and the inertial variable vector is a gravity vector, wherein one axis of the world coordinate system points in the direction of the gravity vector, and the calibration poses comprise only rotations of the stereo camera around at least one of the remaining two axes 10.

18. A stereo camera comprising:
   two cameras mounted on a common holder,
   an accelerometer mounted on the common holder, the accelerometer measuring the direction of gravity, and
   a computing device comprising a computer program product configured to provide numerical compensation of imaging errors caused by a geometrical deformation of a stereo camera in a method comprising:
   providing an inertial variable vector determined by an accelerometer, which inertial variable vector is expressed in a stereo camera coordinate system with a known geometrical relationship between the stereo camera coordinate system and the world coordinate system, and which inertial variable vector relates to a physical force which at least partly causes the geometrical deformation of the stereo camera,
   evaluating a calibrated analytic deformation model of the stereo camera with the inertial variable vector as input to the calibrated analytic deformation model, the evaluation determining angular and positional updates to at least one of the known nominal camera coordinate systems, using the angular and positional updates to determine external camera parameter offsets, determining updated external camera parameters by adding the external camera parameter offsets to the known nominal external camera parameters, and using the updated external camera parameters and known internal camera parameters of the two cameras for stereophotogrammetric analysis of images acquired by the stereo camera, wherein the calibration process receives as input:

a calibration set relating to the stereo camera in a plurality of calibration poses, wherein the calibration set comprises for each calibration pose:

actual external camera parameters, wherein the actual external camera parameters correspond to a geometrically deformed stereo camera in a calibration pose, nominal external camera parameters, an inertial variable vector expressed in the stereo camera coordinate system, wherein a geometric relationship between the world coordinate system and the stereo camera coordinate system differs between different calibration poses, and uses, a cost function for measuring residuals between:

the actual extrinsic camera parameters and updated extrinsic camera parameters obtained by evaluating the analytic deformation model with the inertial variable vector as input and adding the obtained external camera parameter offsets to the nominal external camera parameters, and an optimization algorithm, which identifies value assignments for the free parameters using the cost function evaluated on the calibration set, in particular wherein the optimization algorithm identifies a value assignment of the free parameters which minimizes the cost function over the calibration set.

19. The stereo camera according to claim 18, wherein the stereo camera additionally comprises a strain gauge mounted on the common holder.

20. The stereo camera according to claim 18, wherein the common holder is embodied as a beam having a main direction, and the two cameras are mounted on a same side of the beam at opposite ends with respect to the main direction.

* * * * *